Dec. 20, 1932. L. FRANK 1,891,637
LOCK FASTENER
Filed Sept. 20, 1932
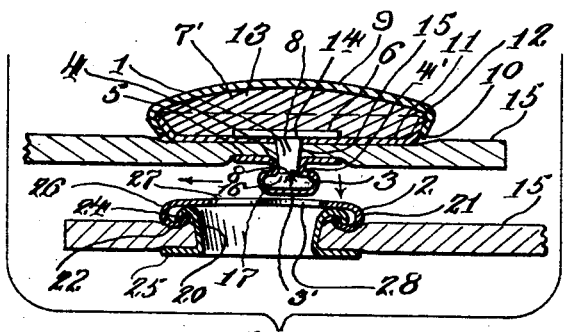
Fig. 1.
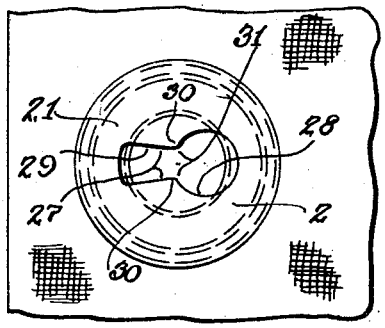
Fig. 2.

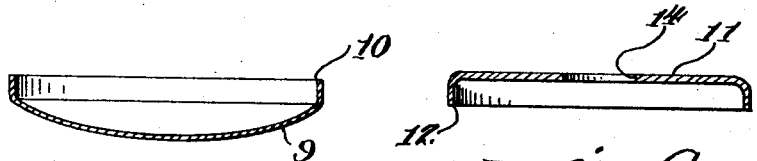
Fig. 5.

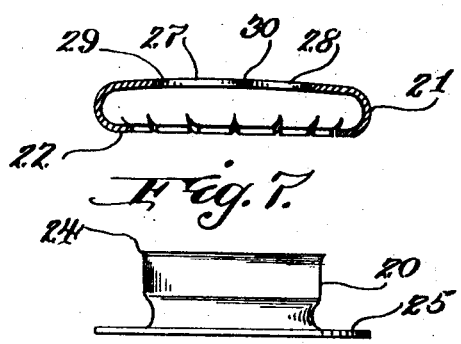
Fig. 7.
Fig. 8.
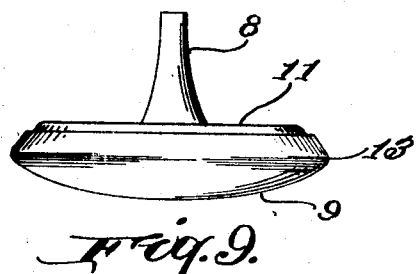
Fig. 9.
Witnesses
Leon Frank Inventor
By Edwin Hannels Attorney Patented Dec. 20, 1932

1,891,637

UNITED STATES PATENT OFFICE

LEON FRANK, OF BALTIMORE, MARYLAND, ASSIGNOR TO ALMA MANUFACTURING COMPANY, OF BALTIMORE, MARYLAND, A CORPORATION OF MARYLAND

LOCK FASTENER

Application filed September 20, 1932. Serial No. 633,939.

The invention relates to a lock fastener which is an improvement upon, and is adapted for use in place of the fasteners of the general type known as snap fasteners, the fastening being, however, of increased security and on this account capable of more general application. As examples of its use, it may be applied to the fastening of wearing apparel in general including body garments, gloves, belts, overalls, jumpers, leggings and the like, also auto seat covers, tents, auto tops, awnings, curtains, etc.

The fastener of the invention which is best termed a lock fastener, possesses the important advantage that while no pressure is required to close it, it is locked by the pull, tending to separate the two ends, edges or members which are fastened. This self locking feature has the further advantage that the fastener can not be opened or unfastened until the tension tending to separate the two members or edges connected by it is relaxed and the fastening members separated by hand. Also, as distinguished from the old glove fastener of the spring head type, it is non-crushable and not affected in any way by the crushing pressure to which it may be subjected.

In the accompanying drawing I have illustrated a lock fastening embodying the features of the invention in the preferred form.

In the drawing:

Figure 1 is a section on an enlarged scale taken through the fastening on a plane of the axis, the male and female members being disengaged and slightly separated, each member being shown in connection with a fragment of the fabric to which it is attached.

Figure 2 is a top plan view of the female member of the fastener drawn to the same scale.

Figure 5 is a diametrical section through the top of the male member, the same being inverted.

Figure 7 shows the top plate of the female member in diametrical section.

Figure 8 shows in elevation the mushroom seating ring of the female member before assembling.

Figure 9 shows the male member assembled except as to the head or stud portion ready for insertion in the fabric or the like to which it is to be attached.

Figure 3:
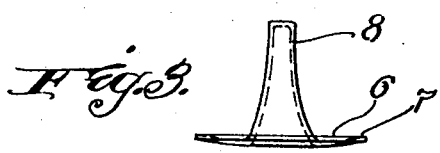
Figure 3 is an elevation of the shank portion of the male member.
Figure 4:
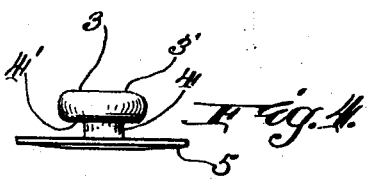
Figure 4 is an elevation of the head or stud portion of the male member before assembling.
Figure 6:
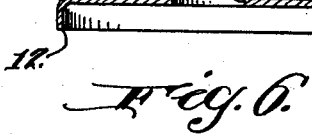
Figure 6 shows the under disk or collet portion of the male member in diametrical section and inverted.

Referring to the drawing by numerals, each of which is used to indicate the same or similar parts in the different figures, the construction shown comprises a male member 1 and a female member 2, which are adapted to cooperate in the manner to be described, the two members comprising the lock fastener of the invention.

The male member 1 carries a head or stud 3 having a shank or neck 4, of relatively reduced diameter. In the preferred form shown, the male member includes a cap 3' of sheet metal which comprises the head or stud, and the shank 4, having its lower edge formed into a flange 5. The male member also includes a shank 6 having a base flange 7 and an upright 8 which is preferably tubular, both members 3' and 6 being in the preferred form produced by stamping from sheet metal as are all of the elements of both the male member 1 and the female member 2.

The male member is also provided with a top member 13 comprising a top 9 which is ordinarily exposed at the outside of the fabric and may be of celluloid or enameled metal or other material which presents a pleasing appearance. This top in the form of the invention shown is circular, but may be of any suitable shape, having its peripheral edge turned downwardly at 10 to receive and enclose a collet 11 which preferably has its peripheral edge turned upwardly so that the turned over edges 10 and 12 may serve as interengaging means for the top and disk, giving the assembled top member 13 a suitable shape and body.

The collet 11 is apertured at the center at 14 to provide for the insertion of the shank 8 which is passed through the collet 11 before assembling the top member 13, the flange 7 of the shank 6 being enclosed within the top member 13 in its finished condition. The top member may also be provided with a filler 7' of fibre or other suitable material.

To assemble the male member as shown in Figure 1, the shank 8 of the member 6 having been passed through the hole 14 in the disk 11, the flange 7 is covered by the filler 7' which fits into the collet 11. The filler may be used to support the flange 7. The collet 11 thus assembled with the shank 6 and filler 7' is then placed in the saucerlike top 9, the edges 10 and 12 being oppositely disposed, and the edges 10 of the top 9 are then turned over the collet 11 as shown in Figure 1.

The male member 1 is then ready to be attached to the fabric and is as shown in Figure 9. To attach the male member to the fabric or the like, the shank 8 is passed through the fabric, the aperture being indicated by reference character 15. The shank may be self piercing, if desired. The cap 3' comprising the head or stud 3 is then passed over the end of the shank 8, so that the edge flange 5 of the cap bears against the fabric oppositely to the top member 13. Suitable pressure is then applied to the stud 3 on one side of the fabric and to the assembled top member 13 on the other side of the fabric, both being thrust toward the center of the fabric whereby the shank 8 is upset at the end as shown at 16 in Figure 1 causing it to mushroom beyond the neck 4 of the cap 3 into the cheeks 17 of the head.

An important feature of the male member 1 is that the head 3 is practically rigid and not subject to crushing, as is the spring head or spring socket fastener now in use. Such crushing results in lateral expansion of the spring members so that the fastener becomes inoperative because the head cannot be inserted in the socket. It will be understood in this connection that in the regular type of snap fastener the fastening operation is dependent upon the springing of the head which is slightly compressed as it enters the socket expanding therein so it resists withdrawal. In other cases a spring socket is used. The device of the present invention in the preferred form is entirely lacking in any dependence upon such spring elements to accomplish the fastening or engaging operation and there is no such close relation between the diameter of the head and the diameter of the opening in the face plate as that which existed between the head of the male member and the socket in the old type of fastener. Crushing of the head, if it should occur, is unimportant and the face plate of the female member is substantially flat so that the width of the slot therein cannot be so changed by crushing as to effect the fastening operation. The old type of fastener, on the other hand, was frequently rendered inoperative by crushing of the head so that it would not enter the socket. It is also of interest that the head 3 is formed with a shoulder 4' which eliminates any tendency of the head to escape from the female member. This shoulder is preferably so placed that the shoulder 4' and flange 5 span the thickness of the top plate 21 of the female member 2, preventing any play or lost motion of one relatively to the other.

The female member 2 in the preferred form as shown consists of a flanged tubular mushroom member 20 and a slotted face plate 21. In the preferred form shown the face plate 21 is circular or of any suitable shape, and is turned over as to its edges at 22 to receive the top edge 24 of the member 20, which is flanged at the bottom at 25 to engage the bottom surface of the material 15. To attach the female member to the material and at the same time to assemble it, the materials may be punched or the sharp upper edge 24 of the mushroom or ring member 20 may be relied upon to cut through the material. In the assembling operation, the member 20 is placed on one side of the material with the edge 24 toward it and the face plate 21 on the other side of the material 15 with the edge 22 toward the material 15. Pressure is then applied to both said members forcing one toward the other. The edges 24 are passed through the material and mushroomed or turned outwardly as shown in Figure 1 within the turned edges 22 of the face plate whereby the assembled female fastening is attached to the fabric by the flange 25 of the mushroom seating ring on one side and the overhang or cheek portion 26 of the face plate on the other side.

The important feature of the female member resides in the form and arrangement of the slot or opening 27 therein, as best seen in Figure 2. This slot or opening has a circular or otherwise enlarged admission portion 28 for the admission of the head or stud 3 of the male member and a locking slot 29 with a reduced passage 31 where the locking slot 29 is merged into the admission opening 28. This passage is shown as formed between projections 30 spaced by a distance which closely approaches and may be slightly less than the diameter of the neck 4. The locking operation is accomplished after the head 3 is inserted through the admission opening 28 by forcing the neck 4 through the relatively narrow passage 31 into the locking slot 29. In thus passing through the passage 31 the neck of the male member or head engages both sides of the narrow portion 31 encountering a sufficient resistance to cause a definite snapping of the parts as the neck 4 enters the locking slot 29. The resistance encountered at this point effects a most satisfactory locking of the fastener. Both the neck 4 and the face plate with its projections 30 are slightly elastic so that they yield minutely in the locking of the fastener. It should also be noted that the slot 29 and the passage 31 are preferably formed between the edges of the face plate 21 which edges are disposed towards said slot and entrance and are substantially flat and of substantially uniform thickness with the remainder of the face plate, as best seen in Figure 7.

This locking operation may be effected by the tension or tendency to separate the members, i. e., the pieces of fabric or the like 15 which are connected by the fastening, and the parts cannot be released until this tension is not only relaxed but the male member is pushed back manually in a direction opposite to the tension, again forcing the neck 4 through the narrow passage 31 into the admission opening 28 from which the head or stud of the male member may be withdrawn.

It will be understood that in assembling the female member the locking slot 29 is disposed relatively to the admission opening 28 in the direction of the tension tending to spread or separate the edges of the material 15 to be fastened. It is also of interest that the shoulder 4' and flange 5, are separated just sufficiently to span the plate 21 and the latter when attached to the fabric lies very close to the plane of the surface of the fabric so that the fastening is not only extremely flat and inconspicuous, but it is in no wise affected as to its operativeness by crushing, as crushing can not easily change the width of passage 31 or the thickness of the neck 4 or the relation of these two elements which is essential to the locking operation.

I have thus described specifically and in detail a lock and fastener embodying the features of the invention in order that the manner of constructing, applying, operating and using the invention may be fully understood, however, the specific terms herein are used descriptively rather than in a limiting sense, the scope of the invention being defined in the claims.

What I claim as new and desire to secure by Letters Patent is:

1. A lock fastener with a metal cap consisting of a top comprised of two interlocking flanged members, a shank with a flanged end, the flanged end being held between said members, a cap having a head, a neck and a flange, the shank being adapted to be upset within the head to hold the material to which the fastener is attached between the cap flange and the top, a female member co-operating with the male member and having a face plate and a mushroom device whereby the face plate is attached to the material, the face plate having an opening adapted to pass the head freely and a slot extending from said opening in the direction of the tension on the fastening when in operation, the slot being of reduced width adjacent said opening providing a resistance to the passage of the neck, the head having a shoulder opposed to the head flange, the shoulder and flange being spaced in correspondence with the width of the face plate, the edge of which enters between the shoulder and flange in the fastening operation, the shoulder serving to prevent play of the head relatively to the face plate.

2. A fastener of the type described having a male member consisting of a head and a neck, with means for fastening the male member to the fabric or material to be fastened and a female member comprising a sheet metal face plate having an admission opening adapted to freely admit the head and a locking slot connected thereto, the locking slot being of a width sufficient only to pass the neck portion and not sufficient to pass the head, the slot having a relatively narrow entrance, the portion of the face plate surrounding the slot being substantially flat on both surfaces and of substantially uniform thickness and the edges of the plate at said entrance being spaced apart by a distance slightly less than the width of the neck, both the neck and the face plate at the entrance to the slot being slightly elastic to give a snap locking action as the neck passes the entrance and enters the slot.

3. A fastener of the type described having a male member consisting of a head and a neck, means for fastening the same to the fabric or material to be fastened and a female member comprising a sheet metal face plate having an admission opening adapted to freely admit the head portion, a locking slot connected thereto, the locking slot being of a width sufficient only to pass the neck portion and not sufficient to pass the head portion, the head having a definite shoulder and a flange spaced by a distance substantially equal to the thickness of the face plate, the portion of which adjacent the slot is substantially flat and of nearly uniform thickness substantially equal to the normal thickness of the plate, the shoulder and flange being adapted to engage the edge portions of the face plate adjacent the slot from opposite sides to prevent play of the head relatively to the plate.

4. In a lock fastener a male member consisting of a hollow top composed of two interlocking plates, a filler between said plates and completely filling the hollow top, a tubular shank with a flanged end, the flange being secured between one plate and the filler, a cap comprising a head, a hollow neck and a flange, the shank being of ductile material and adapted to be upset within the cap to hold the fabric to which the fastener is attached between the flange and the top and to hold the parts in their assembled relation.

5. In a lock fastener a male member having a head with a neck and means for attaching it to the material to be fastened and a sheet metal female member cooperating with the male member and consisting of a face plate with a turned over fabric gripping edge portion and a tubular member having a flange at one end and a fabric piercing edge at the other end, the end of the tube being adapted to mushroom within the face plate whereby the female member is attached to the fabric, said fabric being secured between the flange and said turned over edge portion, the face plate having an opening adapted to pass the head freely and a slot formed in the sheet metal extending from said opening in the direction of the pull on the fastening, the slot having a relatively narrow entrance, the portions of the plate surrounding the slot being substantially flat and of a thickness substantially equal to that of the remainder of the plate and the edges of the plate at said entrance being spaced apart by a distance slightly less than the width of the neck of the male member.

Signed at Baltimore, Maryland, this 16 day of September, 1932.

LEON FRANK.